Jan. 20, 1970  R. C. CRESSEY  3,490,351
MOTION PICTURE CAMERA APPARATUS

Filed Nov. 7, 1966  4 Sheets-Sheet 1

INVENTOR.
RICHARD C. CRESSEY.
BY
D. Emmett Thompson
ATTORNEY.

INVENTOR.
RICHARD C. CRESSEY.
BY
D. Emmett Thompson.
ATTORNEY.

INVENTOR.
RICHARD C. CRESSEY.
BY
D. Emmett Thompson
ATTORNEY.

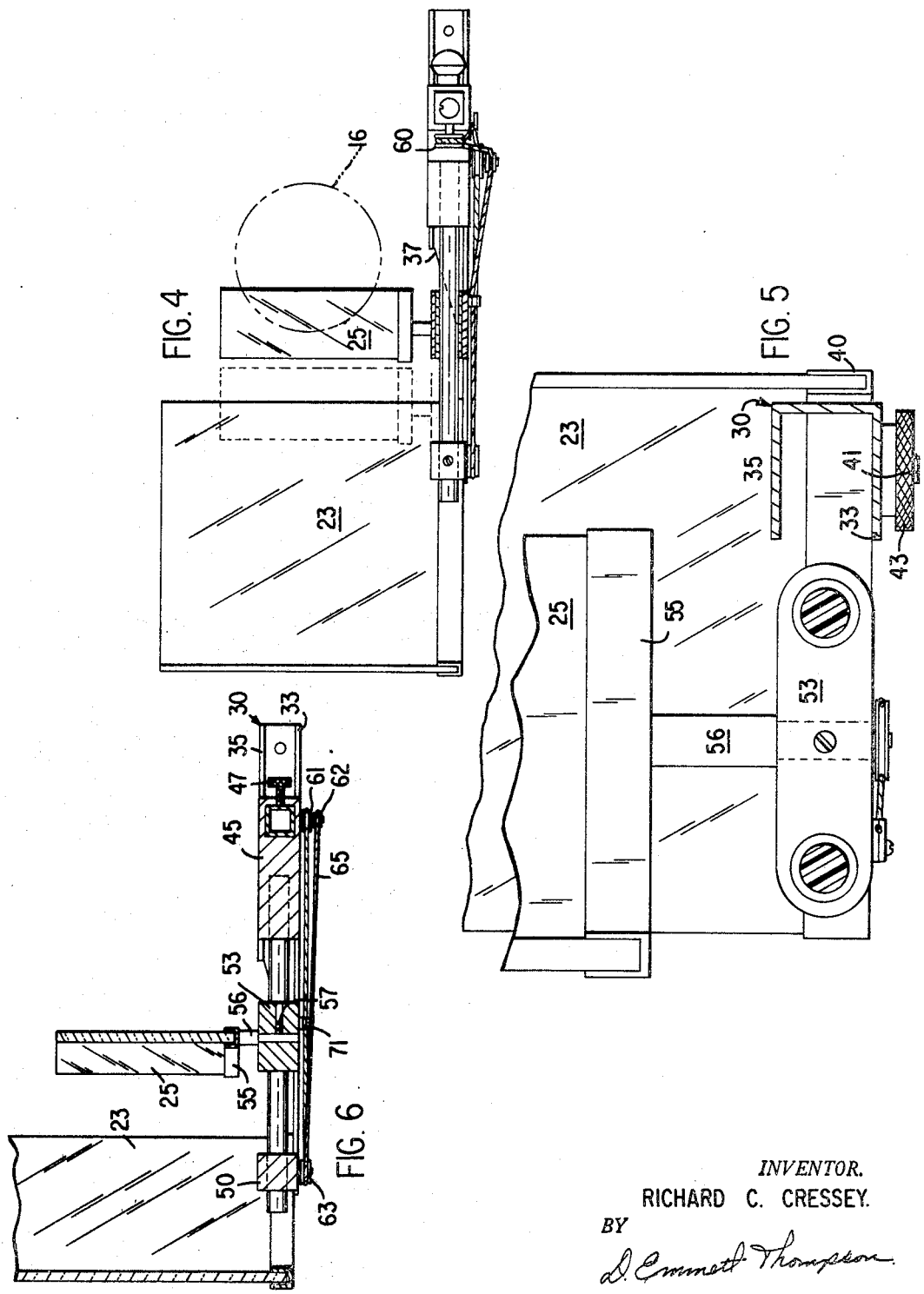

United States Patent Office 3,490,351
Patented Jan. 20, 1970

3,490,351
MOTION PICTURE CAMERA APPARATUS
Richard C. Cressey, 1322 Westcott St.,
Syracuse, N.Y. 13210
Filed Nov. 7, 1966, Ser. No. 592,619
Int. Cl. G03b 17/56
U.S. Cl. 95—86                                    3 Claims

ABSTRACT OF THE DISCLOSURE

A hand support for a camera to be used for interviewing persons is provided with means whereby a reflector may be moved at will into the optical axis of the camera, which, in conjunction with another reflector, introduces into the field of the lens a view toward the rear. This permits a view of the face of the interviewer and photographer to be included in the picture.

---

This invention relates to motion picture camera apparatus. Often, portable noiseless cameras are used in connection with interviewing persons outside of the studio. In conducting such interviews, it is preferable that both the person conducting the interview, and the person being interviewed appear in the picture. At present, this requires the services of two studio employees, the cameraman operating the camera, and the person conducting the interview.

This invention has an object motion picture camera apparatus embodying a novel arrangement by which the cameraman conducts the interview and may, at will, appear in the picture taken during the course of the interview.

The apparatus of the invention includes a camera supporting frame adapted to be worn by the photographer and which serves to support the camera and appurtenances, such as power pack, microphone, tape recorder, lighting equipment, etc., leaving both hands of the photographer free for operating the apparatus.

The apparatus further includes means operated by the cameraman to reflect the facial image of the photographer into the camera lens, whereby the picture includes the cameraman in split screen fashion, as well as the person being interviewed, the reflected image of the cameraman appearing in side by side relation to that of the person being interviewed.

The invention consists in the novel features and in the combinations and constructions hereinafter set forth and claimed.

In describing this invention, reference is had to the accompanying drawings in which like characters designate corresponding parts in all the views.

Figure 2:
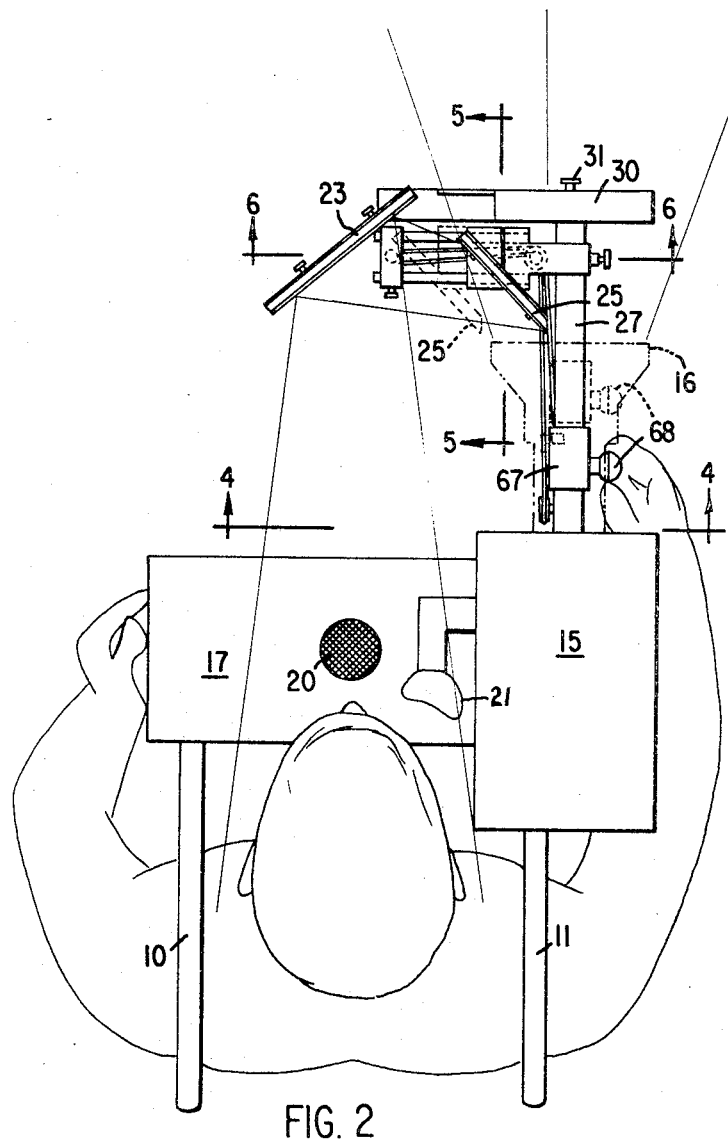
FIGURE 2 is a top plan view of the apparatus.

FIGURE 4 is a view taken on line 4—4, FIGURE 2.
FIGURE 5 is a view taken on line 5—5, FIGURE 2.
FIGURE 6 is a view taken on line 6—6, FIGURE 2.

Figure 1:
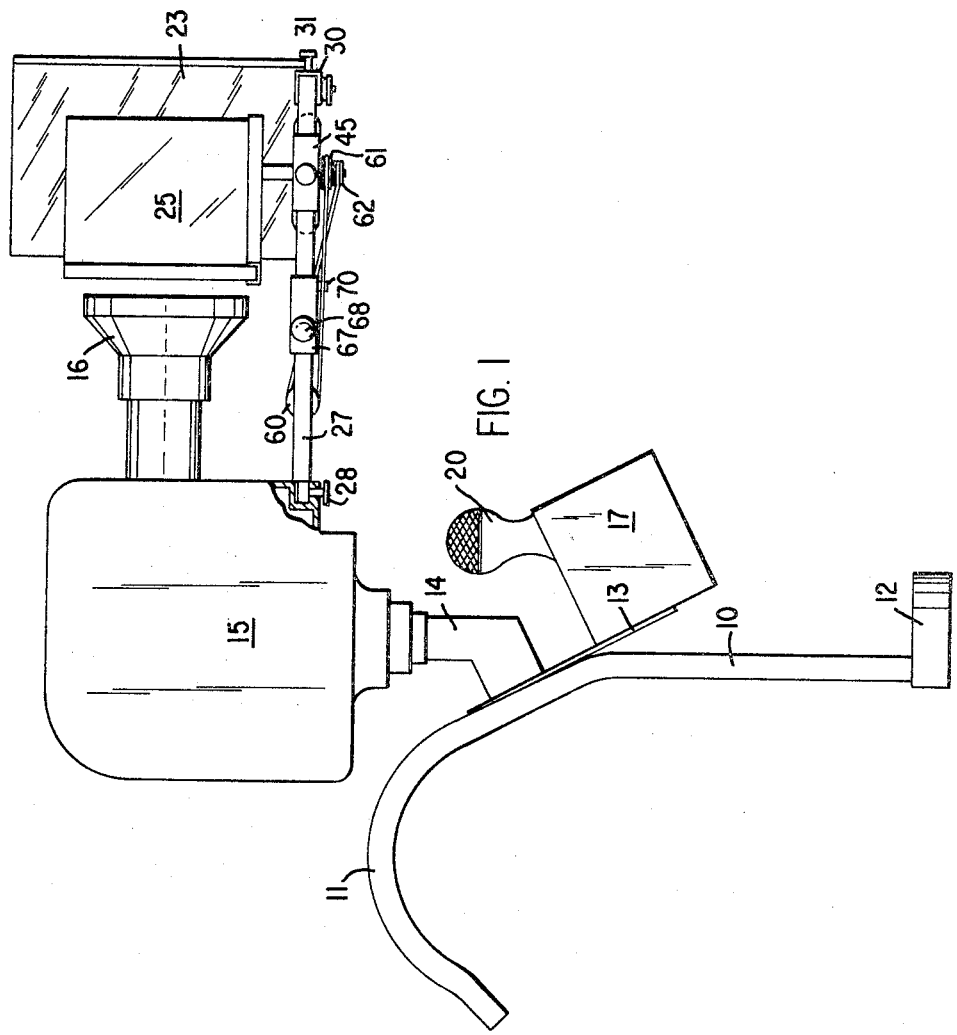
FIGURE 1 is a side elevational view of camera apparatus embodying my invention.

Referring to FIGURE 1, the camera supporting framework includes a pair of rod-like members 10 formed at their upper ends with curved portions 11 adapted to be positioned on the shoulders of the photographer, see FIGURE 2. The lower ends of the members 10 are connected by a cross member 12. A plate 13 is fixed to the rod members 10 and has a bracket means 14 for supporting the camera 15, with the camera lens mounted in the lens housing 16 faced forwardly. A receptacle 17 is also fixed to the plate 13, containing the power pack, tape recorder, or similar apparatus. A microphone 20 is mounted on the casing 17. A waist encircling belt may be attached to the lower ends of the rod members 10 to assist in holding the framework and camera fixedly to the person of the photographer. With this arrangement, the camera is fixedly secured to the person of the cameraman, with the view finder 21 of the camera located for convenient and ready use by the cameraman, and the reflected image of the cameraman, as hereinafter described, is steady on the film even though the cameraman is walking, or turning, while the picture is being taken.

Means is provided for reflecting the facial image of the photographer into the camera lens. This reflecting means includes mirrors 23, 25, which are attached to the camera apparatus by means of a mirror supporting framework. This framework includes a bar 27 affixed to the camera 15 by a locking screw 28, FIGURE 1. The bar 27 is square in cross section and extends forwardly in a plane below the axis of the camera lens. A cross member 30 of channel formation is affixed to the outer end of the bar 27, as by screw 31. The cross member 30 extends at right angles to the bar 27 and in a direction transversely of the axis of the camera lens with an end 32 terminating at one side of the lens axis. This end portion of the bar 30 is formed by the lower flange 33. The top flange 35 is cut away at 36, FIGURE 3, and the forward flange of the cross member 30 is tapered downwardly from the top flange 35, as shown at 37, FIGURES 3 and 4, and terminates remote from the end 32. The mirror 23 is fixedly mounted in a channel 40 provided with a stud 41 extending through an aperture in the bottom flange 33 of the member 30, whereby the mirror 23 may be rotated about the axis of the stud 41 and locked in position by a nut 43, FIGURE 5, threading on the stud 41. By this arrangement, the angle of the plane of the mirror 23, relative to the axis of the lens, may be adjusted.

Figure 3:
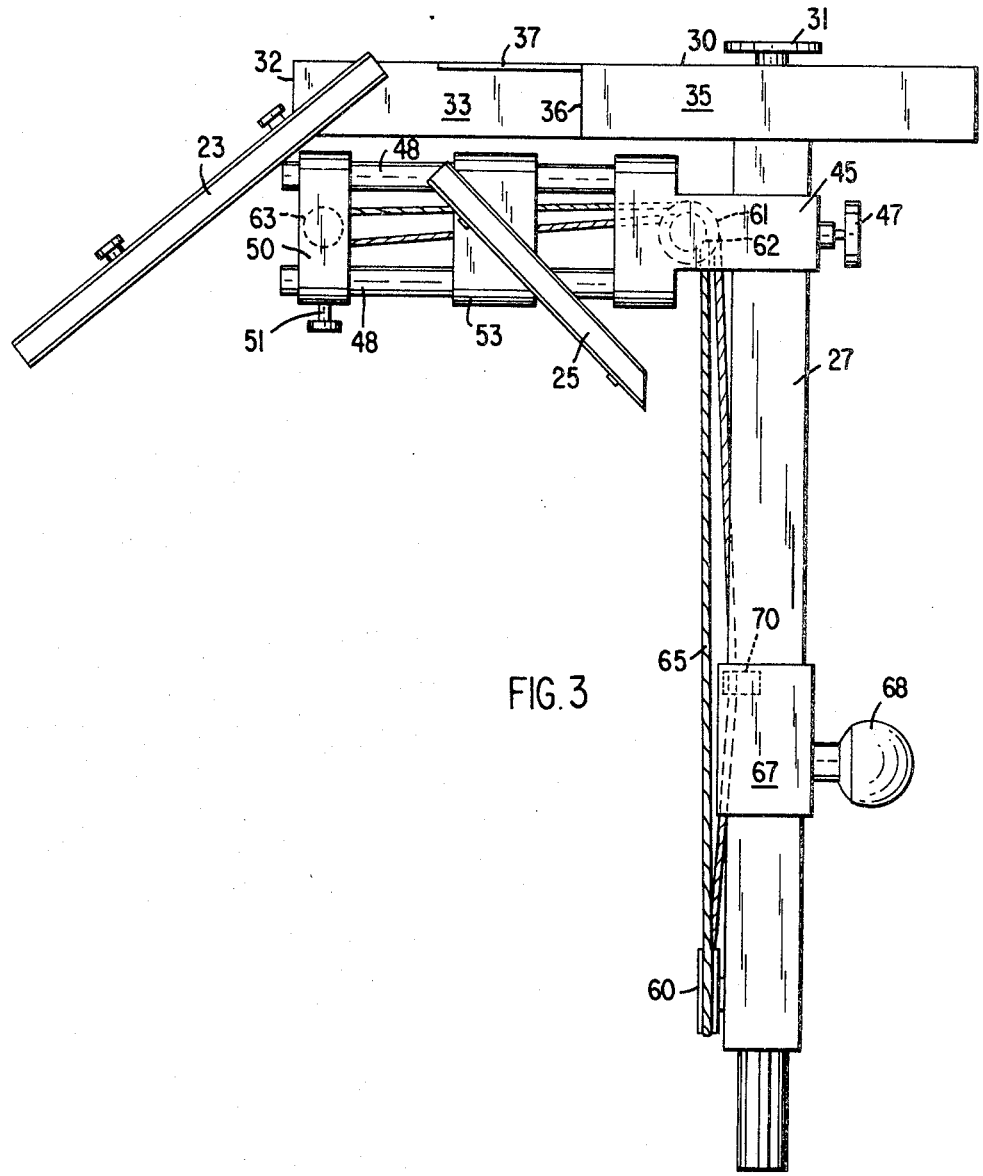
FIGURE 3 is an enlarged top p'an view of the reflecting mirror structure and supporting framework therefor.

A block 45 is slidably mounted on the bar 27 and fixedly secured thereto by a set screw 47, FIGURE 3. A pair of rods 48 are fixedly secured at like ends to the block 45 and extend in parallel relation to the cross member 30. A member 50 is apertured to receive the outer ends of the rods 48 and is fixedly secured thereto by a set screw 51. A block 53 is slidably mounted upon the rods 48. The mirror 25 is also mounted in a channel member 55 which is provided with a stem 56 positioned in an aperture formed in the block 53. The channel and member 25 can accordingly be adjusted about a vertical axis, and is secured in adjusted position by a set screw 57, FIGURE 6.

Means is provided for moving the block 53 and mirror 25 toward and from the axis of the camera lens. In the arrangement shown, a pulley 60 is journalled for rotation on the inner side of the bar 27 in proximity to the camera. A pair of pulleys 61, 62, are journalled on the under side of the block 45. Also, a pulley 63 is journalled on the under side of the cross member 50. A flexible strand 65 is trained about the pulleys 60, 61, 62, 63, and is fixedly secured to a slide 67 mounted on the bar 27 for movement therealong and provided with an operating knob 68. The flexible strand 65 is fixed to the slide 67 by a clamp 70. The flexible strand is also secured to the block 53 carrying the mirror 25, this attachment being by a clamp 71, FIGURE 6.

With this arrangement, when the slide 67 is moved in one direction along the bar 27, the mirror 25 is moved to the right, FIGURE 3, to the full line position shown in FIGURE 2. In this position, the mirror 25 is in registration with the camera lens and the reflected facial image of the photographer is directed into the lens and appears at one side of the picture being taken. The image being received and reflected by the mirror 23 to the mirror 25 and thence to the camera lens, as will be apparent.

When the slide 67 is moved in the opposite direction on the bar 27, the mirror 25 is moved to the left, FIGURES 2 and 3, to the position shown in full line in FIGURE 3 and in dotted outline, FIGURE 2. In this position, the mirror 25 is out of registration with the camera lens and the image of the photographer is not directed thereto and does not accordingly appear in the picture being taken.

It will be apparent that the apparatus described permits the cameraman to create intimacy and screen involvement through the use of the mirror system, allowing the cameraman to introduce his own image in split screen fashion on the film, whereby the cameraman also becomes the reporter, or interviewer.

What I claim is:

1. A one man motion picture interviewing camera apparatus including a camera supporting frame adapted for attachment to the body of the cameraman and having means to support a camera with the lens and view finder of the camera directed forwardly of the cameraman, and with the view finder of the camera positioned for interviewing by the cameraman, a mirror structure carried by said apparatus and mounted forwardly of the camera for reflecting the facial image of the cameraman in a direction parallel to the axis of the camera lens, said mirror structure including first and second mirrors mounted forwardly and laterally of the axis of the camera lens, said first mirror being adjustable to a fixed position, said second mirror being movable laterally toward and from said axis, and means operable by the cameraman for moving said second mirror into and out of registration with the camera lens axis.

2. Camera apparatus as set forth in claim 1, wherein each mirror is adjustable about a vertical axis, and means for securing said mirrors in adjusted position.

3. Camera apparatus as defined in claim 1, wherein said mirror structure includes a mirror supporting frame carried by said apparatus and extending forwardly of the camera below the axis of the lens thereof, a first mirror fixedly mounted on said frame and positioned at one side of the axis of the camera lens, a carrier mounted on said frame intermediate said first mirror and the axis of the camera lens and being movable on said mirror supporting frame toward and from the axis of the camera lens, a second mirror mounted on said carrier, and means operable by the cameraman for moving said carrier to position said second mirror in registration with the camera lens.

References Cited

UNITED STATES PATENTS

| | | | |
|---|---|---|---|
| 1,504,328 | 8/1924 | Douglass | 352—47 |
| 2,746,369 | 5/1956 | Beard | 95—86 |
| 2,827,832 | 3/1958 | Patterson | 95—1.1 X |
| 3,168,856 | 2/1965 | Norden | 95—1.1 |

JOHN M. HORAN, Primary Examiner

U.S. Cl. X.R.

352—47, 93